United States Patent [19]

Hartmann

[11] Patent Number: 4,976,515

[45] Date of Patent: Dec. 11, 1990

[54] METHOD OF DRIVING A FERROELECTRIC TO DISPLAY DEVICE TO ACHIEVE GRAY SCALES

[75] Inventor: Wilbert J. A. M. Hartmann, Eindhoven, Netherlands

[73] Assignee: U.S. Philips Corporation, New York, N.Y.

[21] Appl. No.: 283,416

[22] Filed: Dec. 12, 1988

Related U.S. Application Data

[63] Continuation-in-part of Ser. No. 160,424, Feb. 25, 1988, Pat. No. 4,840,462.

[30] Foreign Application Priority Data

Dec. 21, 1987 [NL] Netherlands .......................... 8703085

[51] Int. Cl.⁵ .............................................. G02F 1/13
[52] U.S. Cl. ................................ 350/333; 350/350 S; 340/784
[58] Field of Search ..................... 350/350 S, 333, 332; 340/784, 805, 765

[56] References Cited

U.S. PATENT DOCUMENTS

| | | | |
|---|---|---|---|
| 4,638,310 | 1/1987 | Ayliffe | 350/350 S |
| 4,655,550 | 4/1987 | Crossland et al. | 350/350 S |
| 4,701,026 | 10/1987 | Yazaki et al. | 350/333 |
| 4,705,345 | 11/1987 | Ayliffe et al. | 350/350 S |
| 4,712,872 | 12/1987 | Kanbe et al. | 350/333 |
| 4,725,129 | 2/1988 | Kondo et al. | 350/333 |
| 4,765,720 | 8/1988 | Toyono et al. | 350/350 S |
| 4,770,502 | 9/1988 | Kitazima et al. | 350/333 |
| 4,796,980 | 1/1989 | Kaneko et al. | 350/350 S |
| 4,818,077 | 4/1989 | Ohwada et al. | 350/350 S |
| 4,840,462 | 6/1989 | Hartmann | 350/350 S |
| 4,901,066 | 2/1990 | Kobayashi et al. | 350/350 S |
| 4,904,064 | 2/1990 | Lagerwall et al. | 350/333 |

OTHER PUBLICATIONS

Clark et al., "Fast and Bistable Electric-Optic Displays Using Ferroelectro Liquid Crystals" Eurodisplay-19-84-pp. 73-76.

Primary Examiner—Stanley D. Miller
Assistant Examiner—Tai V. Duong
Attorney, Agent, or Firm—John C. Fox

[57] ABSTRACT

In the case of active drive of a ferro-electric liquid crystal display device the picture elements within the line selection period are first brought to an extreme state by means of a "blanking" signal. To obtain grey scales in a reproducible manner (via charge compensation) the data signal is preferably presented during a period which is short with respect to the switching period of the ferro-electric liquid crystal.

16 Claims, 3 Drawing Sheets

$V_{bi} < V < 0$ $V = V_1$ $V = V_2$

METHOD OF DRIVING A FERROELECTRIC TO DISPLAY DEVICE TO ACHIEVE GRAY SCALES

This application is a continuation-in-part application of previous application, Ser. No. 160,424, filed Feb. 25, 1988, now U.S. No. 4,840,462 and all benefits for the common subject matter are hereby claimed.

BACKGROUND OF THE INVENTION

The invention relates to a method of driving a display device comprising a ferro-electric liquid crystal between two supporting plates and a system of picture elements arranged in rows and columns, the picture elements being constituted by picture electrodes arranged on the facing surfaces of the supporting plates and a system of row and column electrodes, at least one row of picture elements being selected via a row electrode during a line selection period, and data signals being presented via the column electrodes, the row of picture elements being brought to an extreme state by means of an auxiliary signal prior to presenting the data signals.

In this connection an extreme state is understood to mean such a state that the picture element is substantially completely transmissive or non-transmissive. This state is determined by the type of ferro-electric device; this will be explained hereinafter. The choice of the amplitude of the auxiliary signal also determines the speed at which the liquid crystal switches to this extreme state.

Such a method is used, for example, in display devices for display screen or television applications. Notably for television applications and non-volatile memory display devices, the use of ferro-electric liquid crystal materials appears to be attractive because they can realize much faster switching times than nematic liquid crystal materials.

Other advantages are less dependence on the viewing angle (because generally a smaller thickness is used and because of the orientation of the molecules in planes parallel to the walls), and greater contrast.

A method of the type mentioned in the opening paragraph is described in EP 0,197,242, in which the presentation of data signals in synchronism with a selection signal is preceded by so-called "blanking" pulses which must bring the liquid crystal to an initial state. To inhibit degradation of the ferro-electric material, the sign of the pulses used is periodically reversed.

The method described in said Patent Application is used in a display device comprising a so-called passive matrix; the said signals (selection signals, data signals, "blanking" pulse) are directly presented to the row and column electrodes. The state of a picture element is determined by the line and data voltages. Since data voltages are presented to the column electrodes also during non-selection of certain picture elements, voltages, possibly in combination with cross-talk signals, may be produced so that the desired transmission state (transmissive or non-transmissive in the embodiment of EP 0,197,242) is not reached or is lost.

The said Patent Application proposes to solve this problem by providing the ferro-electrical effect with a given threshold. Such thresholds cannot be realized or can hardly be realized in practice without loss of contrast occurring in applications using large numbers of lines. In the said Patent Application mention is only made of switching between the states "0" and "1" and the possibility of introducing grey scales in the devices shown is not referred to.

To obviate these problems U.S. Pat. No. 4,840,462, issued June 20, 1989 in the name of the Applicant proposes a method in which the picture elements are connected to the column electrodes via active switching elements during at least a part of the line selection period in order to present data signals to the picture elements, and in which the auxiliary signal is presented to the picture elements via the same switching elements at an instant before the start of the line selection at least during a period which is equal to the switching period of the ferro-electric medium and has such a duration and amplitude that the extreme transmission state is reached. After the line selection period the picture elements assume a transmission state which is substantially only determined by the data signal presented.

In this connection, the term "substantially only determined by the data signal presented" is understood to mean that the voltage present across the picture element during selection and the capacitance associated therewith is maintained and may possibly change to some extent due to leakage currents, but that no measures have been taken to generate a given voltage across the picture element during the non-selection period, as is shown, for example, in EP 0,176,763.

In the method as shown in the U.S. Pat. No. 4,840,462, grey scales are obtained in a reproducible manner in that the ferro-electric liquid crystal is brought each time to an extreme state for the purpose of selection. Consequently a successive charge compensation cannot take place in a so-called "active" matrix so that the growth of regions where transmission may or may not occur is inhibited. The auxiliary signal for obtaining an extreme state ("blanking") is presented before a selection signal, while a data signal coinciding with at least a part of the selection signal determines the ultimate transmission state (grey scale).

The said Application describes an embodiment of an auxiliary circuit in which the so-called "blanking" signals are presented six line selection periods before the line selection period coinciding with the data voltages by means of, inter alia, multiplex circuits and shift registers.

Dependent on the speed of the ferro-electric medium, the number of intermediate line selection periods may have a different value.

SUMMARY OF THE INVENTION

A method according to the invention is characterized in that the auxiliary signal is presented to the picture elements via active switching elements during at least a first part of the line selection period and in that the picture elements are connected to the column electrodes via the same switching elements during a second part of the line selection period in order to present data signals to the picture elements, the auxiliary signal being presented at an instant before the presentation of the data signals during at least a period which is equal to the switching period of the ferro-electric medium, and has such a duration and amplitude that the extreme transmission state is reached, whereafter the picture elements assume a transmission state which is substantially only determined by the data signals presented.

The invention is based on the recognition that sufficiently fast ferro-electric liquid crystalline media enable the auxiliary signal and the data signal to be presented within the same line selection period at such values of the line selection period (<64 μsec) that the method is suitable for reproducibly setting grey scales in the case of video applications. Moreover, a simpler auxiliary circuit for generating selection signals may suffice.

Another method according to the invention for displaying grey scales is characterized in that the grey scale is determined by the duration and the amplitude of a data signal presented. Thus, the data signal determines the grey scale at equal selection periods.

The data voltages are preferably presented during a period which is short with respect to the switching speed of the ferro-electric liquid crystalline medium. Since a charge compensation effect is concerned, applying a given voltage across the picture elements, as described in EP 0,176,763, will not result in a stable final state (grey scale). Neither will this state result from using a passive drive method in which voltages are directly presented to the picture element via the data electrodes outside the actual selection period.

An additional advantage of the method according to the invention is that the ferro-electric liquid crystalline material need not have a threshold.

Preferably, the substantially non-transmissive state is chosen as the extreme transmission state. This is favourable from a perceptive point of view because it only affects the maximum brightness to a small extent, whereas loss of contrast, which is sooner visible, occurs when substantially completely transmissive state as the extreme transmission state.

The auxiliary signal may be realized in different manners, dependent on the switching elements and drive method used. In a FET (field effect transistor) switch, bipolar transistor or other three-pole switch, the auxiliary signal is usually presented to the column electrode during a first part of the line selection period before the relevant row of picture elements is written, while the actual data are presented during the second part of the line selection period.

BRIEF DESCRIPTION OF THE DRAWINGS

The invention will now be described in greater detail, by way of example, with reference to the accompanying drawings in which.

The Figures are diagrammatic and not to scale. Corresponding components generally have identical reference numerals.

DESCRIPTION OF THE PREFERRED EMBODIMENT

Figure 1:
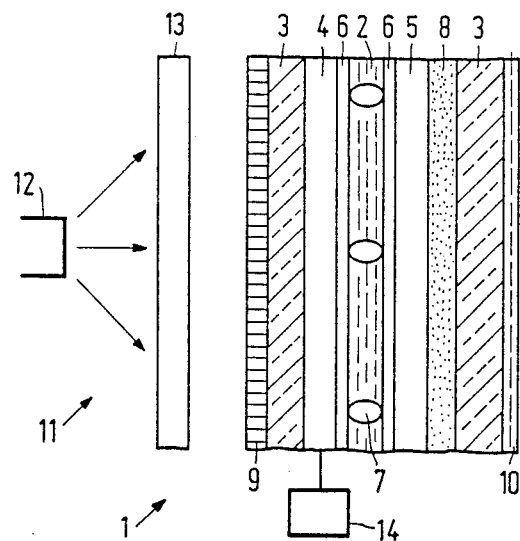
FIG. 1 is a diagrammatic cross-section of the structure of a liquid crystal display device based on a ferro-electric liquid crystal.

FIG. 1 shows in a diagrammatic cross-section a display device 1 with a ferro-electric liquid crystal 2 as described, for example, in the article by Clark and Lagerwall in "Appl. Phys. Lett.," 36 (1980), 899, or in European patent Application EP 0,032,362. The liquid crystal 2 is present between two flat transparent supporting plates 3 of, for example, glass or mica. A matrix of picture electrodes 4 is present on one of the supporting Plates, which picture electrodes define the picture elements (pixels) and are driven, for example, via row electrodes and switching elements, while data signals are presented via column electrodes. A counter-electrode 5 is present on the other supporting plate. This counter-electrode may be connected to a fixed or a variable voltage. The thickness of the liquid crystal layer 2 is approximately 2 μm.

If desired, the electrodes 4, 5 are coated with orientation layers 6 or protective layers, while the device is also provided with spacers 7 to obtain a uniform thickness of the liquid crystal layer. The display device has also a filter layer 8 with, for example, separate colour filters for the colours red, green and blue, as well as a polarizer 9 and an analyzer 10. The device also includes a light source 11 consisting of a lamp 12 and a diffusor 13, while the matrix 4 and associated elements are driven by drive electronics 14.

Figure 2A:
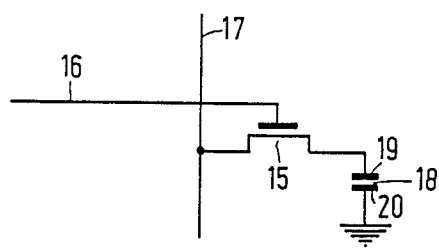
FIG. 2a is a schematic diagram of one picture element of an active matrix display incorporating the device of FIG. 1.

FIG. 2a shows diagrammatically how a single pixel of such a display device is driven by means of an active switching element, a thin-film field effect transistor 15 in this embodiment. A selection line 16 is connected to the gate of the field effect transistor, while data signals are presented to the data line 17 which is connected to the liquid crystal display element, which in this embodiment is shown diagrammatically in the form of a capacitance 18, the other terminal of which is (virtually) connected to ground.

Dependent on the switching element used (for example, MIMs or diode rings), the row electrode (selection line 16) may be provided on the one supporting plate and the column electrodes (data line 17) may be provided on the other supporting plate.

FIG. 2b through g shows diagrammatically the state of a liquid crystal display element when a given voltage is applied across this element which is shown in the form of a capacitance 18. In this example the voltage is applied in a pulsatory form to the data line 17, after the element 18 is selected via the selection line 16.

According to the inventive method an auxiliary signal ("blanking") $V_{b1}$ is applied first, which signal is negative in this example and which brings the pixel to an extreme state with a transmission of substantially 0.

Due to this negative voltage pulse the first electrode 19 (which is connected to the transistor 15) becomes negative. By relaxation of the dipoles 21 associated with the molecules of the ferro-electric liquid crystal material these dipoles are directed in such a manner that the charge on the electrodes 19 20 of the capacitance 18 is fully compensated or is compensated to a maximum possible extent. This results in all dipoles being identically directed (situation in FIGS. 2b and e) at a sufficiently negative auxiliary voltage $V_{b1}$.

Figure 2B:
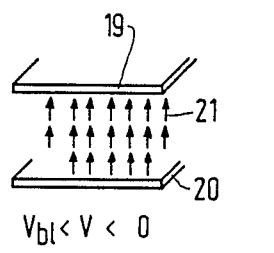
FIG. 2b through g illustrates the realization of grey scales in a single picture element.
Figure 2C:
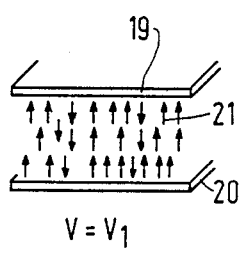
Figure 2D:
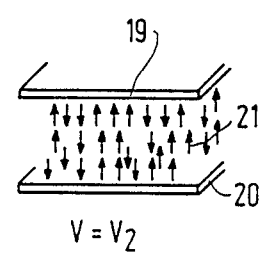
Figure 2E:
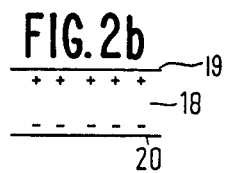
Figure 2F:
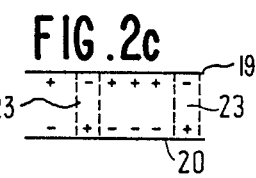
Figure 2G:
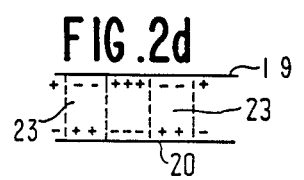

When driving at a voltage having a value of $V_1$ which is slightly positive, the electrode 19 acquires a slightly positive charge so that some of the dipoles 21 flip over (situation in FIG. 2c). This is continued until the positive charge has been compensated for; in this case domains 23 may be formed in the liquid crystal in which the dipoles are flipped over in defined region between the two electrodes 19, 20 (situation in FIG. 2f).

At a somewhat larger voltage $V_2$ more and larger domains 23 will be produced (situation in FIG. 2b). The surface roughness of the wall may also play a role in this flip-over process.

If in the case of, for example, the situation in FIG. 2c and f, the voltage pulse having a value of $V_1$ is repeated, as is conventional practice notably in video applications, and if this is done without taking any further measures, the electrode 19 will again acquire a slightly positive charge. Since this charge is compensated again by flipping over the dipoles 21, the number of dipoles 21 which has flipped over increases. As a result the domains 23 increase in number and size.

The presence of these domains where the transmission is no longer 0 determines the grey value of the relevant pixel. Without special measures this grey value, notably in TV applications, is thus not constant if the data signal remains the same, because the domains 23 increase when the voltage pulse is frequently presented. Also in the case of changing data signals the grey value of the pixels is dependent on their history.

Figure 4A:
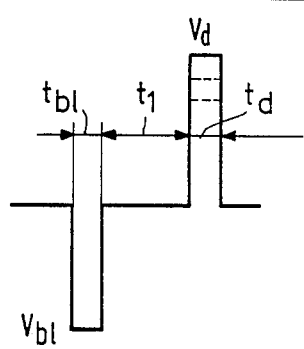

However, in the method according to the invention a row of pixels is brought to an extreme state (for example that of situation in FIG. 2b) by means of the auxiliary signal $V_{b1}$ having a pulse width $t_{b1}$ before the actual data signal with pulse width $t_d$ is presented (FIG. 4a). This is effected timely enough to cause the dipoles in this row of pixels to relax to the initial state. Since a charge effect is concerned in this case, the value of the auxiliary signal $V_{b1}$ is also dependent on the period during which this auxiliary signal is presented. Since the domains 23 do not grow now, the transmission state, notably the grey scale of the pixels is now exclusively determined by the data signal presented.

Figure 3A:
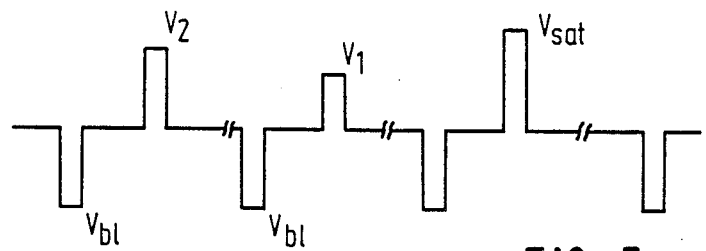
FIGS. 3a and b and 4a and b illustrate drive methods nd the responses of a device of FIG. 1 according to the invention.
Figure 3B:
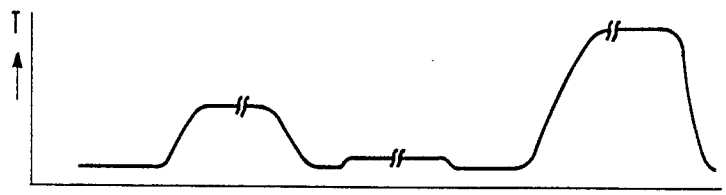

This is further illustrated for a single pixel with reference to FIG. 3, in which the signals $V_2$, $V_1$, $V_{sat}$ presented to the data lines during selection are preceded by an auxiliary signal $V_{b1}$ in FIG. 3a, so that the associated transmission levels T in FIG. 3a, are indeed exclusively determined by the discrete value of each data signal, and not the cumulative value of these signals.

FIG. 4 shows how the use of this method results in a given grey value if a pixel is driven by means of a voltage pulse having a voltage value $V_d$ and a pulse width of the order of 16–64 $\mu$sec, while an auxiliary signal ("blanking") having a voltage value $V_{b1}$ and a pulse width of the same order ($t_d = t_{b1}$) is presented in advance (FIG. 4a).

Figure 4B:
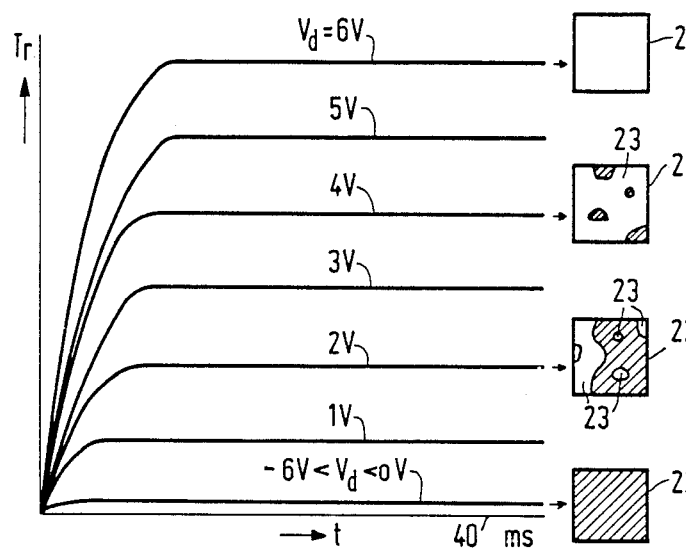

The auxiliary signal is spaced before the drive signal to such an extent (namely a period $t_1$) that the extreme transmission state can be reached. FIG. 4a shows diagrammatically the voltage variation with respect to time of the drive signals, while FIG. 4b shows via the squares 22 the transmission of the associated pixels for some typical voltages. In the relevant example in which $V_{b1}$ is chosen to be $-6V$, there is no transmission for $-6V < V_d < 0V$, a small transmission for $V_d = 2V$, almost full transmission for $V_d = 4V$ and full transmission for $V_d = 6V$. The squares 22 actually have a dimension of 10 $\mu$m $\times$ 10 $\mu$m so that the domains 23 are not separately visible but are experienced as an intermediate transmission state (grey value, colour level).

By means of active drive and by using an auxiliary (blanking), signal bringing the pixels to an extreme transmission state, it is possible according to the invention to realize grey levels in large display devices based on the ferro-electric liquid crystal materials, because the actual ferro-electric cells switch between black and the zero-order birefringent white. In this example use is made of the ferro-electric material ZLI 3234 (Merck) at a cell thickness of 2 $\mu$m.

Figure 5:
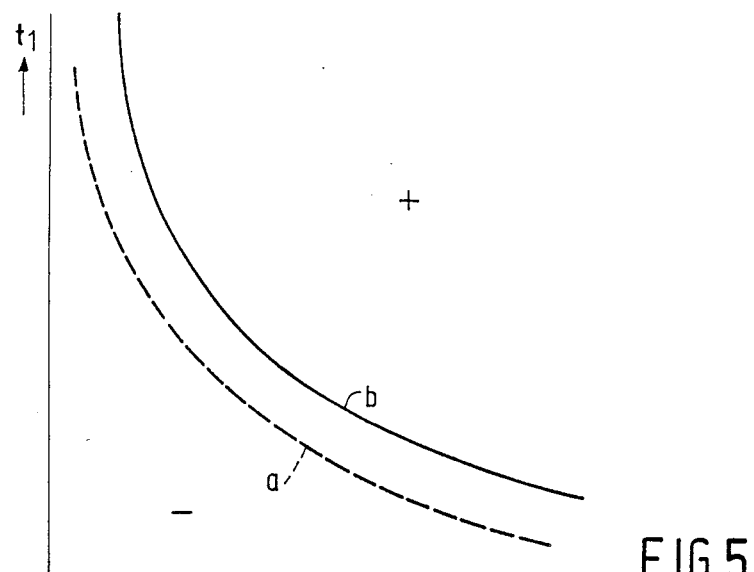
FIG. 5 illustrates diagrammatically the influence of the value of the auxiliary signal.

As already noted, the auxiliary signal $V_{b1}$ must be presented at a period $t_1$ before the voltage pulse determining the transmission value. This period $t_1$ itself is a function of the value $V_{b1}$ of the auxiliary signal, as is shown graphically in FIG. 5. In the region denoted by "+" the device operates as described above; in the region denoted by "−" the grey values vary because not all dipoles are uniformly directed during the period of presentation of the auxiliary signal. FIG. 5 shows the relationship between $t_1$ and $|V_{b1}|$ for a fast switching ferro-electric liquid crystal material (line a) and for a slightly slower switching material (line b).

According to the invention the auxiliary signal and the data signal are presented within one line selection period $t_1$, for example, in accordance with the pattern of FIG. 4a in which preferably $t_1 = 0$, i.e. $t_{b1} \approx t_d$.

Experiments have proved that satisfactory results were achieved in display devices having fast ferro-electric materials (ZLI 3654, Merck) at room temperature as far as brightness, contrast and grey scales were concerned, at line selection period of 128 $\mu$sec and auxiliary voltages $V_{b1}$ of approximately $-8$ Volt.

As the temperature increases, the switching speed of the ferro-electric material increases. At 50° C. similar results were achieved for line selection periods of 50 to 60 microseconds, which is sufficient for video applications. For ferro-electric liquid crystals which are sufficiently fast at room temperature the method may thus be used in LCD TV with ferro-electric liquid crystals.

Due to the speed of the ferro-electric liquid crystalline medium there is probably no longer a full charge compensation effect because the applied voltage now also determines a part of the electro-optical response and hence the adjusted transmission value (grey scale).

Figure 6:
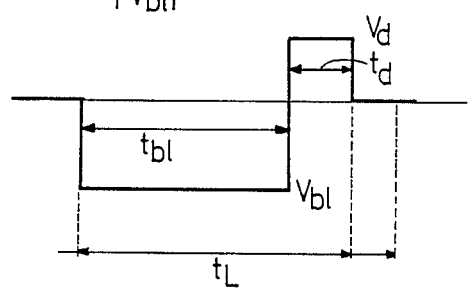
FIG. 6 shows a possible signal at the column electrodes during a line selection period.

Since it is favourable for a good reproducibility of these grey scales to utilize the above-described charge compensation effect, it is preferred for the period $t_d$ during which the data voltages are presented to be kept short with respect to the switching period of the ferro-electric liquid crystalline medium (for example, half or less than half). This can be effected by presenting pulse shapes, as shown in FIG. 4a, within one line selection period or a pulse shape as shown in FIG. 6 in which the auxiliary signal acquires a large pulse width $t_{b1}$.

In the examples given the pixel is substantially non-transmissive to light in the extreme state. This situation is chosen because it is more pleasant to the observer, while there is a small loss of light ouput.

Figure 7:
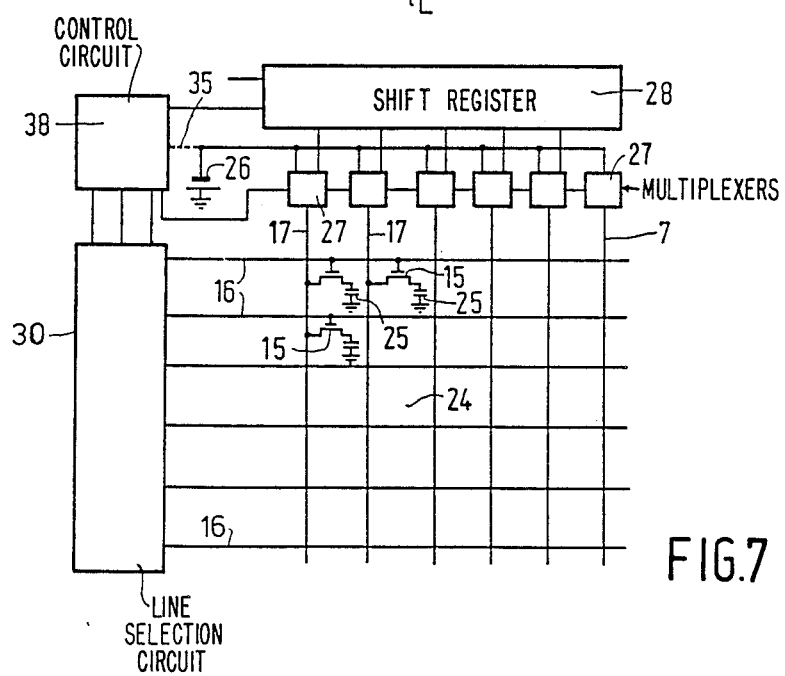
FIG. 7 shows diagrammatically an active matrix display device suitable for use of the method according to the invention.

FIG. 7 shows diagrammatically a device suitable for use of a method according to the invention. This device comprises a matrix 24 of ferro-electric liquid crystal display elements 25 at the area of crossings of selection lines 16, selecting thin-film transistors 15, and data lines 17, to which either an auxiliary signal or data signals are presented. The auxiliary signal in this device is obtained, for example, via a voltage source 26 supplying a voltage $V_{b1}$. During a part of the selection period, for example half this period, the voltage $V_{b1}$ and during the other part (e.g., one half or a shorter part thereof), data signals from a shift register 28 are presented to the data lines 17 via multiplexers 27.

The selection lines are activated, for example, successively, in the manner described, during a line selection period $t_1$ by means of the line selection circuit 30. The assembly is controlled by a control circuit 38 if necessary, this circuit 38 may also supply the auxiliary signal, which is indicated by means of the broken line 35.

I claim:

1. A method of driving a display device comprising a ferro-electric liquid crystal between two supporting plates and defining a system of picture elements arranged in rows and columns, each picture element being constituted by picture electrodes arranged on the facing surfaces of the supporting plates, and a system of row and column electrodes, at least one row of picture elements being selected via a row electrode during a line selection period, and a data signals being presented via the column electrodes, the row of picture elements being brought to an extreme state by means of an auxiliary signal prior to presenting the data signals, the auxiliary signal being presented at an instant before the presentation of the data signals during at least a period which is equal to the switching period of the ferro-electric medium and has such a duration and amplitude that the extreme transmission state is reached, whereafter the picture elements assume a transmission state which is substantially only determined by the data signals presented, characterized in that the auxiliary signal is presented to the picture elements via active switching elements during at least a first part of the line selection period and in that the picture elements are connected to the column electrodes via the same switching elements during a second part of the line selection period in order to present data signals to the picture elements, and further characterized in that the period during which the data signals are presented to the column electrodes is short with respect to the switching period of the ferro-electric liquid crystal.

2. A method as claimed in claim 1, characterized in that the period during which the data signals are presented to the column electrodes covers at most half the switching period of the ferro-electric liquid crystal.

3. A method as claimed in claim 1 for displaying a grey scale, characterized in that the grey scale is determined by the duration and amplitude of a data signal presented.

4. A method as claimed in claim 1, characterized in that the row of picture elements is selected for data display during at most half a line selection period and in that the voltage of the data signal determines the grey scale.

5. A method as claimed in claim 1, characterized in that picture elements in the extreme transmission state are substantially non-transmissive.

6. A method as claimed in claim 1, characterized in that the line selection period is at most 64 $\mu$sec.

7. A method as claimed in claim 2, characterized in that picture elements in the extreme transmission state are substantially non-transmissive.

8. A method as claimed in claim 3, characterized in that picture elements in the extreme transmission state are substantially non-transmissive.

9. A method as claimed in claim 4, characterized in that picture elements in the extreme transmission state are substantially non-transmissive.

10. A method as claimed in claim 2, characterized in that the line selection period is at most 64 $\mu$sec.

11. A method as claimed in claim 3, characterized in that the line selection period is at most 64 $\mu$sec.

12. A method as claimed in claim 4, characterized in that the line selection period is at most 64 $\mu$sec.

13. A method as claimed in claim 5, characterized in that the line selection period is at most 64 $\mu$sec.

14. A display device comprising: a ferro-electro-optical display medium between two supporting plates; a system of picture elements arranged in rows and columns, each picture element being constituted by picture electrodes arranged on the facing surfaces of the supporting plates, and a system of row electrodes and column electrodes for driving the picture elements, the column electrodes connected to outputs of multiplex circuits which switch the column electrodes between the data signals to be displayed and an auxiliary signal so as to bring the liquid crystal element to an extreme state prior to application of the data signal; a control and synchronization circuit, which circuit, simultaneously with a selection voltage on a row of picture elements to be displayed, first causes an auxiliary signal to appear on the column electrodes via the multiplex circuits, which signal has a sufficient duration and amplitude to bring a picture element to an extreme state, and which circuit subsequently causes data signals to appear on the column electrodes, characterized in that the auxiliary signal is presented to the picture elements via active switching elements during at least a first part of a line selection period and in that the picture elements are connected to the column electrodes via the same switching elements during a second part of the line selection period in order to present data signals to the picture elements, and further characterized in that the period during which the data signals are presented to the column electrodes is short with represent to the switching period of the ferro-electric liquid crystal.

15. A display device as claimed in claim 14, characterized in that the data signals are presented during at most half the switching period of the ferro-electro-optical display medium.

16. A display device as claimed in claim 14, characterized in that the multiplex circuits provide the column electrodes with data voltages during at most half a line section period.

* * * * *